United States Patent [19]

Miyauchi et al.

[11] 4,019,915
[45] Apr. 26, 1977

[54] METHOD OF PRODUCING OPTICALLY TRANSPARENT CERAMICS

[75] Inventors: Katsuki Miyauchi; Iwao Matsuyama, both of Hachioji; Gyozo Toda, Hino, all of Japan

[73] Assignee: Hitachi, Ltd., Japan

[22] Filed: Oct. 21, 1974

[21] Appl. No.: 516,498

[30] Foreign Application Priority Data

| Oct. 19, 1973 | Japan | 48-116839 |
| Sept. 20, 1974 | Japan | 49-107821 |
| Sept. 25, 1974 | Japan | 49-109552 |
| Sept. 25, 1974 | Japan | 49-109553 |

[52] U.S. Cl. .................. 106/73.31; 264/1; 264/61; 264/65; 264/332
[51] Int. Cl.$^2$ ................... C04B 35/46
[58] Field of Search .......... 106/73.31; 264/61, 332, 264/65, 1

[56] References Cited

UNITED STATES PATENTS

| 2,956,327 | 10/1960 | Borel et al. ............... 264/61 |
| 3,512,864 | 5/1970 | Haertling et al. ............... 264/332 |
| 3,577,487 | 5/1971 | Sanchez et al. ............... 264/65 |
| 3,704,266 | 11/1972 | Ueoka et al. ............... 264/61 |

OTHER PUBLICATIONS

Snow, "Foburation of Transparent Electrooptic PLZT Ceramics by Atmosphere Sintering," *J. Am. Cer. Soc.*, vol. 56, [2], pp. 91-96.
O'Bryan et al., "Enhanced Ordering of Ferroelectric Domains in PLZT Ceramics," *Cer. Bull.* 51[5] (1972) pp. 479-485.
Haertling et al., "Hot–Pressed (Pb,La) (Zr,Ti)O$_3$ Ferroelectric Ceramics for Electrooptic Applications," *J. Am. Cer. Soc.*, 54[1] (1971) pp. 1-11.
Hyatt et al, "Dielectric Titanate Body Improvement," *Cer. Bull.*, 45[5] (1966) pp. 541-544.
Buckner et al, "Effects of Calcining on Sintering of Lead Zirconate–Titanate Ceramics," *Cer. Bull.*, 51[3] (1972), pp. 218-222.
Haertling, "Hot Pressed Ferroelectric Lead Zirconate–Titanate Ceramics for Electro–Optical Applications," *Cer. Bull.*, vol. 49, No. 6 (1970) pp. 564-568.

*Primary Examiner*—Robert F. White
*Assistant Examiner*—John Parrish
*Attorney, Agent, or Firm*—Craig & Antonelli

[57] ABSTRACT

There is provided a method of producing a ceramic represented by the general formula of ABO$_3$, wherein A includes Pb and at least one element selected from the group consisting of Ba and Sr and B is either of Zr or both of Zr and Ti, by hot-pressing a complex oxide obtained by calcining the mixture of the oxides of A and B characterized by that a solid solution of the oxides of Ba and/or Sr and the oxide of the element constituting B, such as BaTiO$_3$, SrZrO$_3$ or (Ba, Sr)ZrO$_3$, is used as the starting oxides of Ba and/or Sr, and that the starting material contains PbO in an amount of 3 – 20 mol% in excess of that calculated for the objective composition of the final product. Ceramics produced by the method of the present invention have ferroelectric properties and are optically transparent.

21 Claims, 7 Drawing Figures

METHOD OF PRODUCING OPTICALLY TRANSPARENT CERAMICS

BACKGROUND OF THE INVENTION

1. Field of the Invention

The present invention relates to a method of producing ferroelectric ceramics of perovskite-type crystal structures which are represented by the general formula of $ABO_3$, and particularly to a method of making transparent ceramics represented by the general formula of $ABO_3$ wherein A includes Pb and at least one element selected from the group consisting of Ba and Sr and B is a single substance of Zr, both of Zr and Ti or both of Hf and Ti.

2. Brief Description of the Prior Art

Transparent ferroelectric ceramics are exceedingly useful materials for various kinds of light moculators and for image storage and display device since they have superior electro-optic properties.

There have heretofore been known in the art ferroelectric ceramics such as barium titanate ($BaTiO_3$) and a solid solution of lead titanate and lead zirconate ($PbTiO_3$-$PbZrO_3$), which are practically used as a dielectric material, a material for condensers and a piezoelectric material. However, these known ceramic materials are scarcely pervious to light, so that the uses thereof are limited in the aforementioned fields and the applications thereof for the electro-optic field have not been realized at all. In general, most of the materials having crystal structures of perovskite-type represented by the general formula of $ABO_3$ exhibit ferroelectricities. There have been known as the A ion of the above formula Pb and Ba, and as the B ion Zr and Ti. However, any of the materials composed of the aforementioned known ions are not pervious to light.

Ceramics are, as different from single crystals, composed of a large number of fine crystal grains. Ferroelectric ceramics have the same constructions wherein the crystal axes of individual crystal grains are in substantially random orientations. For this reason, when the crystal grain has an optical anisotropy a disconuous shift of the refractive index is caused at the interface of each crystal grain, i.e. at the grain boundary, due to the optical anisotropy.

It will be described hereinbelow the circumstances when a light passes through a ceramic. There has been known that if a light is allowed to pass through a medium including a portion or portions at which the refractive index is discontinuously shifted, the light is always refracted or reflected at such the portion or portions. In the ceramics composed of crystal grains having optically uniaxial or biaxial anisotropies, the grain boundaris and the ferroelectric domain walls act as scattering centers of the light. On the contrary, in case where a ceramic is composed of optically isotropic crystal grains, the grain boundaries do not act as scattering centers any longer since the refractive index is not discontinuously shifted at the grain boundaries. It has thus been derived the conception that the basic condition for obtaining a transparent ceramic is to find out a ceramic material composed of crystal grains which do not exhibit optical anisotropies.

However, the anisotropic characteristics of the ferroelectric materials are considered as the inherent characteristics thereof, and consequently it is also considered inevitable that the unexceptional anisotropies of the individual crystal grains of the ferroelectric ceramics are the characteristic features of such the ceramics. It is accordingly concluded that transparent ferroelectric ceramics which do not cause any scatterings may not be produced in the strict sense of the word. But it is reasonably expected that a ferroelectric material composed of crystal grains having small degrees of anisotropies causes only a small extent of scattering of the light and is capable of being used as a transparent ferroelectric material.

It is further required for the transparent ceramic to be a material which absorbs an extremely small amount of visual lights. It is generally known that the intensity of the light transmitted through a medium or substance decreases in conformity to the following equation:

$$I \propto I_0 e^{-\alpha t}$$

wherein $I_0$ is an incident light intensity, $I$ is a transmitted light intensity, $t$ is thickness of the sample substance, and $\alpha$ is an apparent absorption coefficient of the substance. The apparent absorption coefficient $\alpha$ in the above equation is calculated from the formula including a term with respect to intrinsic absorption due to the absorption of energy and a correction term with respect to scattering caused at points of discontinuity of the refractive index, voids in the ceramic or the grain boundaries. The intrinsic absorption coefficient is inherently defined corresponding to the kinds and the arrangement of the atoms constituting the substance and represents the absorption of the light energy caused by the transition of electrons in the substance. As a consequence, materials for the transparent ceramics are those which have not the intrinsic absorption in the visual range.

It is, therefore, concluded from the above described facts that the materials for the transparent and ferroelectric ceramics shall be those composed of crystal grains which have anisotropies of small degree and do not absorb the visual lights.

On the other hand, there have recently made vigorous investigations for making a transparent ceramic in the field of oxide system ceramics and many attempts have been made to obtain transparent ceramics made of, for example, aluminium oxide ($Al_2O_3$), magnesium oxide (MgO), yttrium oxide ($Y_2O_3$), zirconium oxide ($ZrO_2$), and thorium oxide ($ThO_2$). Up to the present day, ceramics are considered as optically opaque materials, but recently transparent ceramics may be produced by preventing the formation of voids during sintering.

Ceramics are generally obtained by a method which comprises moulding pulverized powders of starting materials and sintering the moulded powders. A number of voids and hollow channels are inevitably included in a green compact formed by the moulding. The total numbers and/or volume of the voids and the hollow channels vary in accordance with the kind of the powder used and the moulding pressure employed, but it is impossible to completely prevent the formation of voids in the green compact only by varying the condition of the compression moulding and to obtain dense ceramics having teoretical densities. In order to vanish the voids for making dense ceramics, a sintering process is indispensable with and in which process almost all of the voids in the green compacts are vanished. It is now to be noted that the voids in the ceramics which act as scattering centers shall be essentially vanished in order to produce transparent ceramics and that the porosities of the known transparent ceramics are less than about 0.5% and no transparent ceramic has been found with the porosity of more than about 0.5%. It is thus concluded that the transparency of ceramics is affected by the residual voids therein and that the porosity due to the voids of the ceramics is varied in accordance with the conditions of the sintering.

There have been proposed some improvements in the known production method of transparent ceramics with respect to the sintering operation thereof in consideration of the above facts. For example, in a method of producing a transparent alumina there has been proposed a method of obtaining a semitransparent sintered alumina which comprises adding a very small amount of magnesium oxide (MgO) into aluminium oxide ($Al_2O_3$), moulding the resultant mixture and sintering the moulded article in a hydrogen atmosphere at a high temperature. The added MgO is segregated at the grain boundaries to prevent the exaggerated grain growth of $Al_2O_3$ thereby to facilitate the diffusion for varnishing the residual voids in the crystal grains through the crystal lattice vacancies.

An alternative known method for vanishing the voids in ceramics other than the above described usual sintering method is a so-called hot-pressing method in which the green compact is formed at a high temperature under a compression pressure. In this method, the voids in the sintered body are pressed out under a relatively low applied pressure by utilizing the phenomenon that the resistance to deformation of the powders decreases at high temperature. According to this method the voids in the sintered body may be further decreased to produce a sintered body of high density by employing jointly with the diffusion vanishing method in the usual sintering method. As is apparent from the foregoing description, the principal subject matter to be solved for producing transparent ceramics is to determine the appropriate sintering conditions for vanishing the voids in the ceramics.

There has recently been developed a transparent ferroelectric ceramics called under the name of "PLZT" which scatters lights only at a small extent. This kind of ceramics is the only one which is presently available as transparent ferroelectric ceramics and has a composition of $(Pb, La)(Zr, Ti)O_3$. This kind of ceramics is produced by adding 5 – 10 at % of La to $Pb(Zr, Ti)O_3$ and a conventionally known piezoelectric ceramic. It has not been theoretically made clear the reasons for the considerable increase in the transparency of the ceramics obtained by dissolving a small amount of La in a form of solid-solution although the $Pb(Zr, Ti)O_3$ per se is not pervious to light. It has thus been assumed that La is essentially added so as to make a solid solution therewith in order for obtaining a transparent ferroelectric ceramics.

However, the known transparent ferroelectric ceramics of PLZT have a disadvantage in that they are apt to be broken down when an alternating current voltage is applied thereto since the lattice structures of the ceramics of the PLZT series inevitably include therein a number of crystal lattice vacancies induced by the charge compensation occurred by the addition of La and they show considerable electrostrictive effects. In contrast thereto, ceramics produced in accordance with the method of the present invention are not broken down when an alternating current voltage is applied thereto and they show satisfactorily stable domain switchings since they do not substantially include crystal lattice vacancies.

SUMMARY OF THE INVENTION

The object of this invention is to provide a novel method of producing a transparent ferroelectric ceramic which does not contain La. A transparent ferroelectric ceramic produced by the method of this invention has not the aforementioned disadvantage of the conventional PLZT series ceramics.

According to the method of this invention it is possible to make transparent ferroelectric ceramics without introducing therein La when the following three conditions are satisfied. The first condition is that the optical anisotropies of the crystal grains constituting the ceramic are small, the second condition is that the crystal grains absorb only a small amounts of visual lights, and the third condition is that no residual voids, which cause the scattering of the lights, are present in the resultant ceramics.

The present invention provides a method of producing a ceramic having a perovskite-type crystal structure and represented by the general formula of $ABO_3$, wherein component A includes Pb and at least one element selected from the group consisting of Ba and Sr and component B is either of Zr or both of Zr and Ti, comprising, calcining the powders of the oxides of component A and the oxides of component B after the intimate mixing thereof to produce a complex oxide, moulding under pressure the complex oxide to make a green compact, hot-pressing and sintering the green compact, which method is characterised by that solid solutions of the oxides of Ba and/or Sr and the oxide of at least one element constituting B, i.e. at least one material selected from the group consisting of titanates, zirconates of Ba and/or Sr and solid solutions thereof, is used as the starting oxides of Ba and/or Sr forming a portion of component A. Examples of the specific solid solutions usable as the starting materials are $BaTiO_3$, $BaZrO_3$, $Ba(Ti, Zr)O_3$, $SrTiO_3$, $SrZrO_3$, $Sr(Ti, Zr)O_3$, $(Ba, Sr)TiO_3$, $(Ba, Sr)ZrO_3$ and $(Ba, Sr)(Ti, Zr)O_3$. The hot-pressing operation is carried out in a flow of oxygen, under the pressure of higher than 70 kg/cm², at the temperture of 1200°– 1500° C for more than 2 hours. Although the hot-pressing may be carried out under a higher pressure the practically applicable pressure ranges from 70 to 400 kg/cm², the upper limit of the practically applied pressure being restricted by the strength of the dies of the press device. The preferable temperature ranges 1300°– 1450° C. The upper limit of the temperature may be raised at a higher level, but the actually usable temperature is practically restricted by the ability of the press device at the above defined value. The preferable time period of the hot-pressing is more than 5 hours and the upper limit thereof is not restricted but in view of the economical standpoint the time period of the hot-pressing is appropriately prolonged up to 200 hours. When the hot-pressing is effected under the conditions wherein the pressure, the temperature and the time period do not satisfy the lower limit of respective values as hereinabove defined, the transparency to the light of the product is disadvantageously lowered. The green compact may be produced from the starting materials as hereinbefore defined in accordance with the well known method employed in the production of ceramics.

Figure 5:
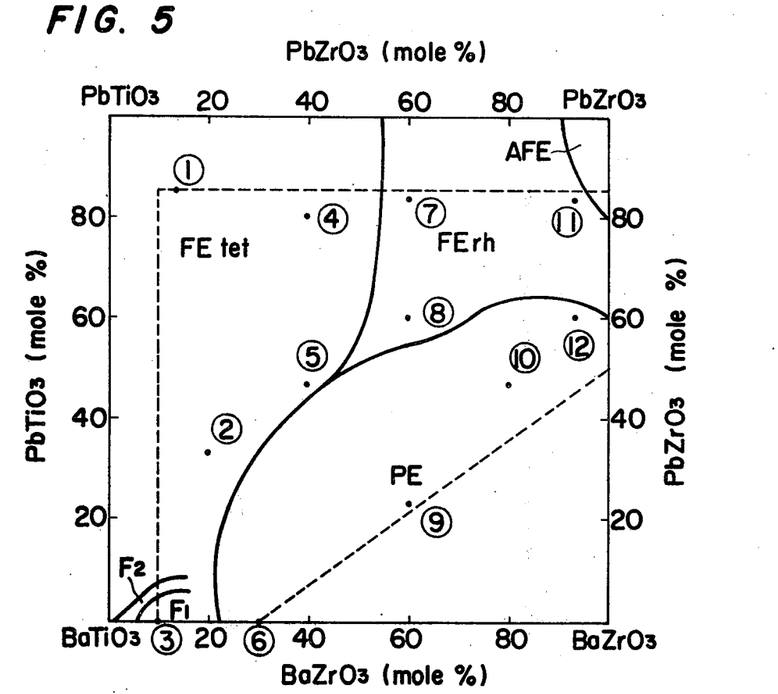
FIG. 5 is a quaternary phase diagram of the $BaTiO_3$-$BaZrO_3$-$PbTiO_3$-$PbZrO_3$ system ceramic wherein preferable composition ranges for obtaining the products having improved properties are shown.
Figure 7:
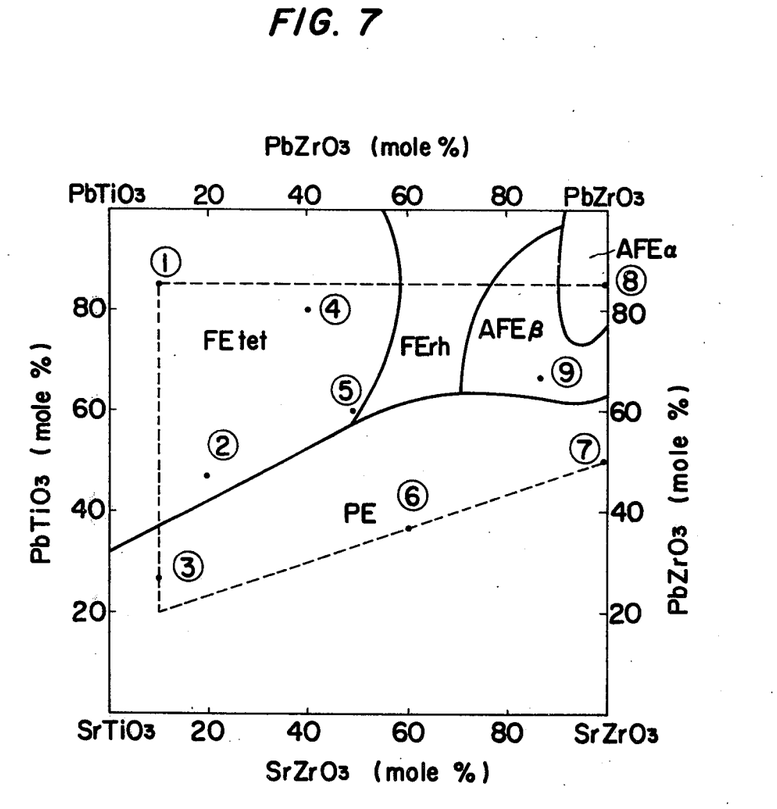
FIG. 7 is a quaternary phase diagram of the $SrTiO_3$-$SrZrO_3$-$PbTiO_3$-$PbZrO_3$ system ceramic wherein preferable composition ranges for obtaining the products having improved properties are shown.

In the exemplary applications of the method of this invention, the particularly preferable composition ranges are shown in FIGS. 5 and 7. In FIGS. 5 and 7, each portion surrounded by the broken lines shows (including the compositions represented by the points on each line) respectively, the particularly preferable composition range of the case where Ba and Pb are used as the component A in the hereinbefore described general formula and in the case where Sr and Pb are used as the component A in the hereinbefore described general formula. More detailed descriptions of FIGS. 5 and 7 will be given hereinbelow in the Examples. The ceramics obtained from the combination, in which Ba, Sr and Pb are used as the component A and Zr and Ti are used as the component B, may be represented by the general formula of $(Pb_{1-x_1-x_2}, Ba_{x_1}, Sr_{x_2})(Zr_y, Ti_{1-y})O_3$. Among these ceramics, the particularly preferable composition range may be defined by $0.05 \leq x_1 + x_2 \leq 0.5$ and $0.6 \leq y \leq 0.91$. The ceramics having the compositions defined by $0.05 \leq x_1 + x_2 \leq 0.3$ and $0.6 \leq y \leq 0.91$ exhibit advantageous and novel characteristics in that they are not only ferroelectric and transparent but also the ferroelectricities thereof are scarcely dependent on the temperature.

Ceramics produced by the method of this invention and having hereinabove defined constitutions do not contain La, nevertheless they have ferroelectric properties along with transparent properties. The remarkable effect of the present invention has been made clear by the fact that even when a ceramic having the aforementioned composition is produced by the conventional method without using a solid solution of oxides as starting oxides, the obtained ceramic does not show transparent property.

The advantageous effect of the present invention may be attained i. by selecting such a ceramic composed of crystal grains having small optical anisotropies and having such the compositions that absorb minimum amounts of visual lights, ii. by determining the optimum hot-pressing conditions for decreasing the residual voids, and iii. by using a solid solution of oxides as a starting material in order to uniformly distribute each element thereby to remove the cause for the increase in the residual voids and concurrently to prevent the deterioration of the optical properties of the sintered body.

When the starting material contains PbO in an amount of 3 – 20 mol% in excess of that calculated for the objective composition of the final ceramic, the obtained ceramic has a higher transparency to considerably improve the effect of this invention. The remarkably improved transparency of the ceramic obtained with the excess amount of PbO is considered to be attributed for the reasons that the PbO value is compensated by the excessly fed PbO during the sintering operation unless otherwise lost by the evaporation thereof and that the excess PbO forms a liquid phase during the sintering operation to promote the rearrangement of the solid particles and at the same time to promote the dissolution of the components forming the solid particle into the liquid phase followed by the precipitation of the components on the other particles thereby to facilitate the formation of the satisfactorily dense sintered body. When the excess amounts of the PbO is less than 3 mol% improvement in the transparency of the product is not sufficiently attained, and when the excess amounts of the PbO exceeds 20 mol% it is required to raise the hot-pressing temperature or to further prolong the hot-pressing time period, both of which are not practically applicable.

As is described hereinbefore, the well known method may be employed for producing the green compact in the method of this invention. The object of this invention may be attained even when a solid solution of oxides is not used as the starting material but employing the following method. The method comprises preparing a solution containing the elements which constitute the component A, dispersing uniformly the elements constituting the component B into the solution, admixing oxalic acid in the presence of an alcohol thereby to form a satisfactory uniform precipitate composed of the oxalates of the component A and the oxide of the component B, drying the precipitate into dried powders, calcining the powders to produce a complex oxide, and moulding under pressure the complex oxide to make a green compact. Suitable alcohols are methanol, ethanol, propanol and the like, and the concentration range thereof is determined so as not to prevent the disolution of the component A and the general concentration is about 50%. The maximum concentration of the component A in the aqueous solution is corresponding to the solubilizable amount of the component A and the lowest limitation thereof is not restricted unless the concentration is too low to decrease the efficiency of the method. The concentration of the component B is determined in consideration of the concentration of the component A and the objective composition of the product. The added equivalent of oxalic acid is 1.05 – 1.1 times as high as that of the component A. The thusly produced precipitate is composed of extremely fine particles and has a superior reactivity. Subsequently, the objective product having superior properties similarly as in the case where a solid solution of oxides is used as a starting material may be obtained by calcining the dried powders of the precipitate to proceed solid phase reaction. The calcination operation may be carried out at a commonly employed calcination temperature, i.e. at about 900° C, but the calcination temperature in this method may be lowered to about 600° C. When the calcination is effected at a lower temperature, the particle sizes of the obtained powders of a complex oxide becomes finer accommpanied with an advantage that the sinterability of the powders in the subsequent sintering step may be improved.

Similarly as in the aforementioned case, a transparent ferroelectric ceramics may be obtained when Hf and Ti are used in place of Zr or both of Zr and Ti. The obtained ceramics may be represented by the general formulae of $(Pb_{1-x}, Ba_x)(Hf_y, Ti_{1-y})O_3$ and $(Pb_{1-x}, Sr_x)(Hf_y, Ti_{1-y})O_3$, and good results may be obtained when the ceramics have the compositions defined by $0.15 < x < 1.0$ and $0 \leq y < 0.9$ in the former formula and $0.15 < x < 0.7$ and $0 \leq y < 0.9$ in the latter formula.

Other ceramics advantageously produced in accordance with the method of this invention are:

a. Ceramics represented by the general formula of $ABO_3$ wherein A is at least one element which forms univalent or divalent cation and selected from the group consisting of Li, Na, K, Pb and Ca and B is at least one element which forms pentavalent or tetravalent cation as a mean ion valence and selected from the group consisting of Mg, W, Sc, Nb, In, Ta, Cd, Zr, Ti and Ni:

b. $(1-x)KNbO_3-xKTaO_3$, $0.3 < x < 0.6$;

c. $(1-x)PbTiO_3-xCaTiO_3$, $0.40<x<0.65$;
d. $(1-x)BaTiO_3-xSrTiO_3$, $0.05<x<0.06$;
e. $(1-x)BaZrO_3-xCaZrO_3$, $0.01<x<0.17$;
f. $(1-x)BaTiO_3-BaSnO_3$, $0.05<x<0.20$;
g. $(1-x)NaNbO_3-xKTaO_3$, $0.06<x<0.61$;
h. $(1-x)PbTiO_3-xCaSnO_3$, $0.20<x<0.60$;
i. $(1-x)PbTiO_3-xSrSnO_3$, $0.20<x<0.35$;
j. $(Pb_{1-x}, Ba_x)(Sn_{1-y}, Ti_y)O_3$, $0.2<x<1.0$, $0.1<y<0.8$;
k. $(1-x)PbTiO_3-x(Li_{1/2}, Ce_{1/2})TiO_3$, $0.55<x<0.65$;
l. $(1-x)PbTiO_3-x(Li_{1/2}, Nd_{1/2})TiO_3$, $0.50<x<0.65$;
m. $(1-x)PbTiO_3-xPb(Mg_{1/2}, W_{1/2})O_3$, $0.5<x<1.0$;
n. $(1-x)PbTiO_3-x(K_{1/2}, Bi_{1/2})ZrO_3$, $0.25<x<0.45$;
o. $(Ca_x, Sr_y, Ba_z)TiO_3$, $x+y+z=1$, $0<x<0.6$, $0.2<y<1$, $0<z<0.7$; and
p. $(Ca_x, Ba_y, Pb_z)TiO_3$, $x+y+z=1$, $0.45<x<0.55$, $0<y<0.35$, $0.2<z<0.55$.

The present invention will be more fully understood with reference to the drawings and the examples hereinbelow set forth.

DESCRIPTION OF THE PRESENTLY PREFERRED EMBODIMENTS

EXAMPLE 1

This example relates to a method of producing a transparent ferroelectric ceramic represented by the chemical formula of $(Pb_{0.7}, Ba_{0.3})(Zr_{0.65}, Ti_{0.35})O_3$.

Appropriate amounts of a barium titanite powder ($BaTiO_3$, purity: 99.9%), a lead oxide powder (PbO, purity: 99.9%), a zirconium oxide powder ($ZrO_2$, purity: 99.9%), and titanium oxide powder ($TiO_2$, purity: 99.9%) were weighed out and put together, the appropriate amount of each material being calculated to confirm the composition ratio represented by the above chemical formula. Additional excess amount (about 10 mol%) of the PbO powder and distilled water were added and the resultant mixture was intimately mixed by a ball mill. The mixture was then subjected to evaporation to dryness, and the dried mixture was calcined in an atmosphere of oxygen at 900° C for one hour. The calcined mixture was roughly crushed in an agate pestle into powders and mixed again in a ball mill together with acetone added thereto.

The powders were then heated at 700° C for one hour in an atmosphere of flowing oxygen to evaporate off the acetone absorbed in the powders. The calcined powders were moulded in a steel die under a compression pressure of 350 kg/cm² to form a green compact having dimensions of 15 mm in diameter and 8 mm in height. The green compact was then charged into an alumina die which was put in an electric furnace and hot-pressed to sinter the compact. The sintering was effected in such a manner that the alumina die, containing the specimen which was put in the electric furnace for the hot-pressing, was evacuated at 200° – 400° C for about 60 minutes to a vacuum degree of $10^{-2}$ Torr, the atmosphere in the furnace was then replaced with oxygen, and the die was heated in an atmosphere of flowing oxygen to be hot-pressed at 1400° C for 5 hours under a compression pressure of 150 kg/cm².

Figure 1:
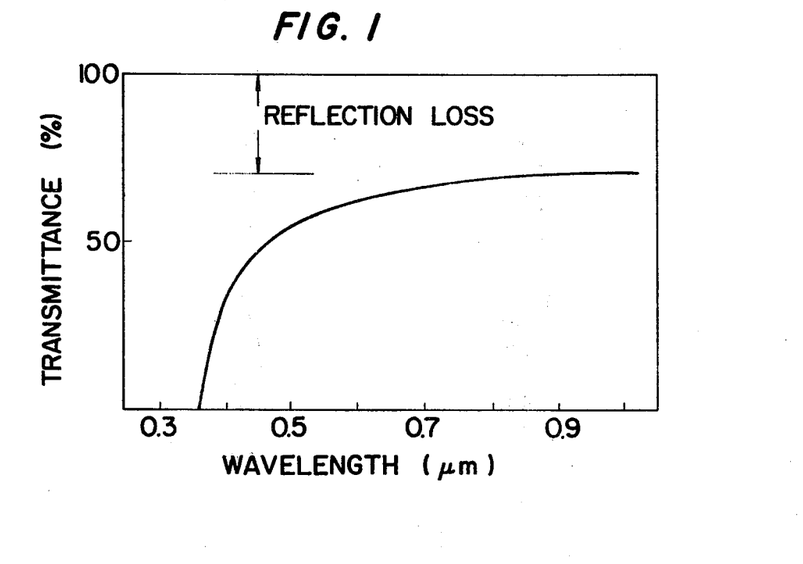
FIG. 1 is a graph showing the wavelength dependence of transmittance of the ceramic represented by the chemical formula of $(Pb_{0.7}, Ba_{0.3})(Zr_{0.65}, Ti_{0.35})O_3$ which is produced in accordance with one Example of the present invention.

The hot-pressed specimen was removed from the alumina die by a diamond core-drill, cut into a shape of desired dimensions by a diamond cutter, and the both surfaces of the specimen were then polished to have optical finishes. FIG. 1 shows the wavelength dependence of transmittance of the ceramic produced by this particular Example, the data being obtained by using a specimen of 300 m thickness and having surfaces of mirror polish. In this instance, the transmittance is the ratio of the light transmittance into a given detector aperture angle to the incident light intensity when parallel light rays of a constant intensity are passed through a specimen of a predetermined thickness. Let us suppose that the incident light is perpendicular to the surface of the specimen, the reflection loss by the specimen runs up to about 30%. From FIG. 1, it is readily understood that the light transmittance of the specimen produced by this particular Example is extremely high, viz., it corresponds to more than 90% of the theoretical value, when the reflection loss is considered for the measured value. Further, it is observed from FIG. 1 that the ultraviolet absorption ends at 0.36μm and that the specimen does not absorb lights of visual range. The ceramic specimen was then subjected to an X-ray diffractiometry with the aim to reveal the crystal structure thereof to obtain the result that it was a rhombohedral crystal having a crystal axial angle of 89°54′. Accordingly, it may be said that the crystal is a material conveniently to be made transparent since the distortion of such the crystal from the cubic crystal is extremely small and the optical anisotropy thereof is also small.

For the purpose of comparison, the conventional method will be briefly described hereinbelow. Starting materials usable in the conventional method are powders of lead oxide (PbO), zirconium oxide ($ZrO_2$), titanium oxide ($TiO_2$) and barium oxide (BaO) or barium carbonate ($BaCO_3$). These powders are intimately mixed together in an appropriate ratio calculated in accordance with the objective composition. Solid solution ceramics may be made from the mixture through a calcination step, pulverization step and a sintering step. Uniform dispersion of each component element is essential where a solid phase reaction takes place in the sintering step as is the case of the above composition. Segregation of the component elements prevents the sintering process and causes formations of a number of residual voids in the sintered body, and moreover, considerably deteriorates the optical properties of the sintered body.

REFERENCE EXAMPLE 1

This particular Reference Example set forth the ceramic having the same composition as that of the ceramic described in Example 1 above but produced by the conventional method, for the comparison purpose.

BaO powder was used as a starting material in place of barium titanate. The powders of the starting materials were mixed together in the ratio calculated in accordance with the objective composition. In order to facilitate sintering, the hot-pressing was effected at 1400° C, which was higher than the usual sintering temperature (1200° C), under a pressure of 150 kg/cm$^2$ for 5 hours. The obtained ferroelectric ceramic was translucent and the light transmittance thereof was 12%. The reason for the low light transmittance of the product is considered that ceramics of chemically uniform composition may not be obtained by the conventional method since the solid phase reaction between the BaO powder and the powders of other oxides does not sufficiently take place, which causes the deterioration of the optical properties of the resultant ceramics.

Another ceramic was produced by using a BaCO$_3$ powder as the starting material and hot-pressed, similarly as in the case wherein BaO is used as the starting material, at 1400° C for 5 hours. The obtained sintered body includes therein residual voids. As a result, the density of the sintered body is low and the light transmittance thereof is 8%. BaCO$_3$ is generally converted to BaO at a temperature of up to 1400° C by the following dissociation reaction:

$$BaCO_3 \rightarrow BaO + CO_2 \uparrow$$

The thusly generated gaseous CO$_2$ has a tendency to remain in the sintered body so that a dense sintered body having a superior transmittance property without voids may not be obtained when BaCO$_3$ is used as a starting material.

In the method of the present invention, barium titanate is used as a starting pwodered material with the aim to eliminate the above-mentioned disadvantages. It is to be noted that the use of a BaTiO$_3$ solid solution powder in place of a BaO powder or a BaCO$_3$ powder is one characteristic feature of this invention which differentiates the same from the conventional method. Namely, in the method of this invention Ba value is essentially introduced into the ceramic from a starting material of solid solution, such as barium zirconate or barium titanate.

EXAMPLE 2

A transparent ferroelectric ceramic represented by the chemical formula of (Pb$_{0.7}$, Ba$_{0.3}$) (Zr$_{0.65}$, Ti$_{0.35}$)O$_3$ was produced similarly as in Example 1 except in that the all of the starting materials were weighed out and mixed together in accordance with the objective composition without adding the excess amount of PbO. The obtained transparent ferroelectric ceramic exhibited the light transmittance of about 27%. As is clearly shown, a ceramic produced by the method of this invention using barium titanate as a material including Ba, even when it is produced without adding excess PbO, exhibits light transmittance considerably higher than that of the ceramic having the same composition but produced by the conventional technique. However, it is to be noted that the light transmittance of the ceramic of this particular Example is lower than that of the ceramic obtained in Example 1 where an excess amount of PbO is added to the starting materials.

EXAMPLE 3

The present Example relates to a method of producing a transparent ferroelectric ceramic having the chemical formula of (Pb$_{1-x}$, Ba$_x$)ZrO$_3$.

Figure 2:
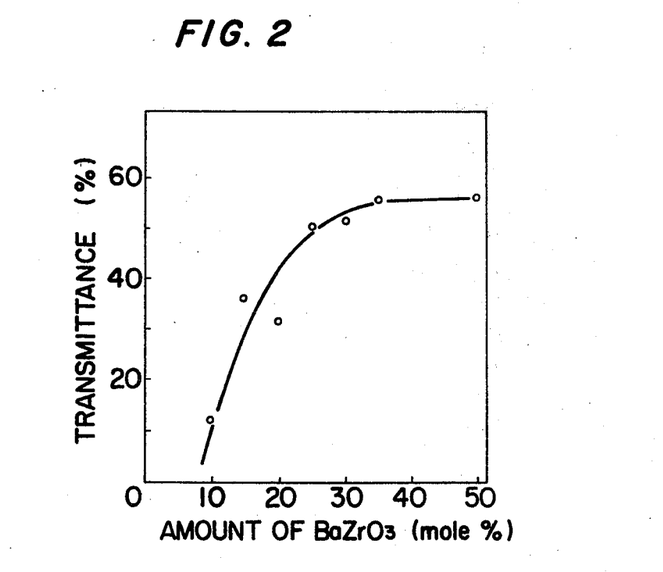
FIG. 2 is a graph showing the interrelationship between the Ba content and the light transmittance of the ceramic represented by the chemical formula of $(Pb_{1-x}, Ba_x)ZrO_3$ which is produced in accordance with one Example of the present invention.

Starting materials used were powders of PbO, ZrO$_2$ and BaZrO$_3$, from which sintered bodies were produced by hot-pressing the same similarly as in Example 1. The hot-pressing the same similarly as in Example 1. The produced ceramics have the compositions wherein $x = 0.10; 0.15; 0.20; 0.25; 0.30; 0.35$ and $0.50$. FIG. 2 shows interrelationship between the light transmittances (%) of these ceramics and the contents (mol%) of the solid solution of BaZrO$_3$. The light transmittance was measured at the wavelength of 0.55μm using samples of 250μm thickness. As is apparently shown in FIG. 2, when about 10 mol% of BaZrO$_3$ is added to the ceramic of PbZrO$_3$ the light transmittance of the obtained ceramic increases with the increase of the content of the added BaZrO$_3$. The increase in light transmittance is saturated to arrive at the highest value of about 55% when the content of the added BaZrO$_3$ reaches 35 mol%. In the meanwhile, any samples having compositions within the above-mentioned range do not absorb visual lights.

Figure 3:
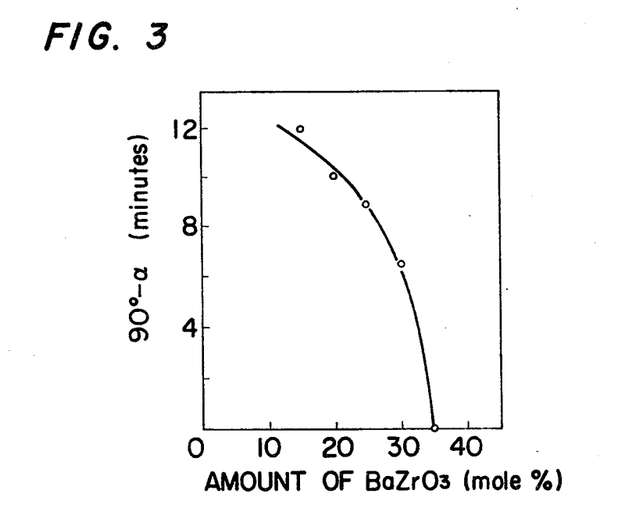
FIG. 3 is a graph showing the interrelationship between the Ba content and the crystal axial angle ($\alpha$) of the ceramic represented by the chemical formula of $(Pb_{1-x}, Ba_x)ZrO_3$ which is produced in accordance with one Example of the present invention.

FIG. 3 shows the crystal axial angle $\alpha$ of the obtained ceramic in terms of the composition of the ceramic of rhombohedral crystal system. From FIG. 3, it is known that the value of 90° - $\alpha$ decreases with the increase of the content of BaZrO$_3$ solid solution. The crystal axial angle $\alpha$ of the rhombohedral crystal represents anisotropy of the crystal lattice, i.e. distortion extent from the cubic crystal. In general, the ceramic having the larger distortion angle 90° - $\alpha$ the larger becomes the optical anisotropies of the crystal grains which constitute the sintered ceramic, followed by the increase in the amount of light scattered at the ferroelectric domain walls and so on, which results lowering of the light transmittance of the overall ceramic. As shown in FIG. 3, the distortion angle decreases, viz., the light transmittance is improved, as the content of the added BaZrO$_3$ increases.

Figure 4:
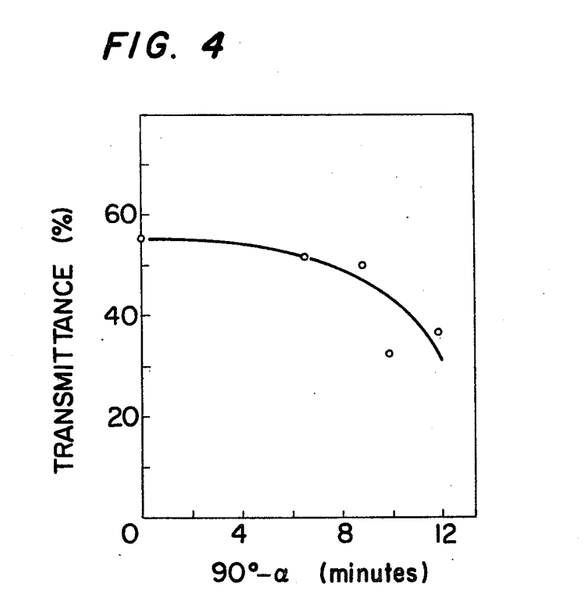
FIG. 4 is a graph showing the interrelationship between the crystal axial angle and the light transmittance of the ceramic represented by the chemical formula of $(Pb_{1-x}, Ba_x)ZrO_3$ which is produced in accordance with one Example of the present invention.

FIG. 4 shows the light transmittance of the solid solution ceramic of (Pb$_{1-x}$Ba$_x$)ZrO$_3$ system in terms of the anisotropy of the crystal. The above-mentioned tendency is well shown in FIG. 4, and the smaller the distortion angle 90° - $\alpha$, the higher is the light transmittance.

In case where the crystal structure is tetragonal, as similar with the above rhombohedral crystal system, the distortion angle from the cubic crystal is interrelative to the light transmittance of the ceramic. In this case, the light transmittance of the ceramic increases as the parameter $a/c$ (axial ratio) showing the distortion angle approaches to 1. It is thus concluded that in order to obtain a transparent sintered ceramic of quarternary perovskitetype oxide generally represented by (Pb, Ba) (Zr, Ti)$O_3$, the composition of the ceramic should be selected so as to minimize the distortion angle of the obtained crystal from the cubic crystal.

EXAMPLE 4

Solid solution ceramics generally represented by (Pb$_{1-x}$, Ba$_x$) (Zr$_y$, Ti$_{1-y}$)$O_3$ were produced in similar manners as described in Example 1. The test results with respect to the light transmittances of the obtained ceramics are shown in Table 1. Sample numbers set forth in Table 1 correspond to the numbers written in each composition in FIG. 5 which shows the quarternary phase diagram of BaTiO$_3$-BaZrO$_3$-PbTiO$_3$-PbZrO$_3$ system. According to the present invention, ceramics were produced by using a BaTiO$_3$ powder as a starting material, and hence there are observed only few uneven phases and/or residual voids, which cause the scattering of light, in any of the samples of various compositions after they are subjected to hot-pressing. As described hereinbefore, in general, the light transmittance of the ceramics largely depend on the optical anisotropies of the crystal grains which constitute the ceramics. However, the optical anisotropies of the ceramics obtained by the particular Example depend on their compositions only at the small extent, which is considered to facilitate the high light transmittance attained by the ceramics. The light transmittance of each sample set forth in Table 1 was measured at a wavelength of 0.55μm using the sample of 250μm thickness. In FIG. 5, FErh represents a ferroelectric phase having a crystal structure of rhombohedral system, FEtet represents a ferroelectric phase having a crystal structure of tetragonal system, AFE represents an antiferroelectric phase having a crystal structure of orthorhombic system, F$_1$ represents a ferroelectric phase having a crystal structure of rhombohedral system, F$_2$ represents a ferroelectric phase having a crystal structure of orthorhobic system, and PE represents a paraelectric phase having a crystal structure of cubic system.

In FIG. 5, the values of $x$ and $y$ are graduated in percentages, so that the abscissa corresponds to 100$y$ and the ordinate corresponds to 100(1−$x$). In FIG. 5, the practically applicable compositions exhibiting high light transmittance are shown by the portion surrounded by the broken lines. Ranges outside of the portions surrounded by the broken lines are not preferable for the practical application of the present invention for the following reasons. Among those outside ranges, the portion vicinal to the BaZrO$_3$ side is improper since the compositions within this range apts to segregate ZrO$_2$ during the sintering step and thus the production thereof is difficult, the portion of BaTiO$_3$-PbTiO$_3$ side is improper since the compositions within this range apts to vary during the sintering step which causes difficulties in their productions, and the portion of PbTiO$_3$-PbZrO$_3$ is improper since the light transmittance of the ceramics having the compositions within this range are low.

Table 1

| Sample No. | Light Transmittance (%) |
|---|---|
| 1 | 29 |
| 2 | 47 |
| 3 | 44 |
| 4 | 37 |
| 5 | 53 |
| 6 | 50 |

Table 1-continued

| Sample No. | Light Transmittance (%) |
|---|---|
| 7 | 31 |
| 8 | 51 |
| 9 | 50 |
| 10 | 49 |
| 11 | 27 |
| 12 | 54 |

EXAMPLE 5

This Example relates to a method of producing a transparent ferroelectric ceramic represented by the chemical formula of (Pb$_{1-x}$, Sr$_x$)(Zr$_{0.7}$, Ti$_{0.3}$)$O_3$.

A transparent sintered ceramic having the composition set forth in the above chemical formula was prepared similarly as in Example 1 except that strontium titanate (purity: 99.9%) was used in place of a powder of barium titanate and that a cylindrical green compact of 10 mm in height was moulded. A sample specimen of 250 μm in thickness and having both surfaces of mirror finish was prepared by cutting and polishing. The specimen was then heated at 500° C for one hour to remove the stress caused by the machining. The light transmittance of the thusly prepared specimen was measured.

Figure 6:
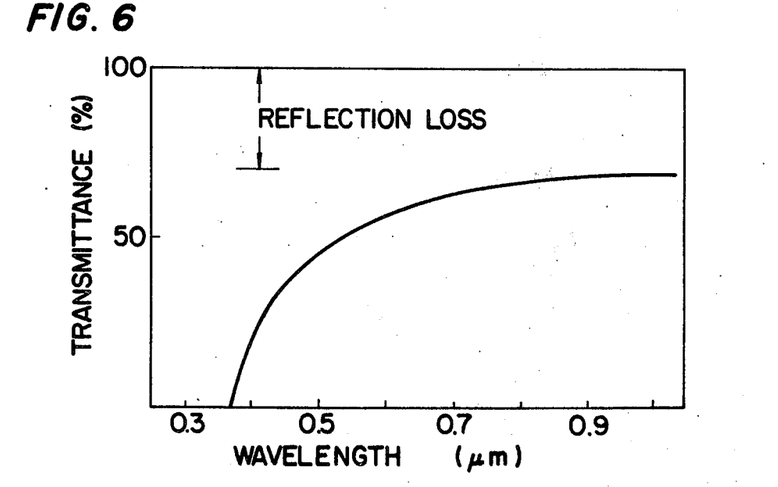
FIG. 6 is a graph showing the wavelength dependence of transmittance of the ceramic represented by the chemical formula of $(Pb_{0.74}, Sr_{0.26})(Zr_{0.70}, Ti_{0.30})$ which is produced in accordance with one Example of the present invention.

In FIG. 6, there is shown the wavelength dependence of the transmittance of the specimen obtained by the aforementioned method and having a composition represented by the chemical formula of (Pb$_{0.74}$, Sr$_{0.26}$)(Zr$_{0.70}$, Ti$_{0.30}$)$O_3$. The thickness of the specimen is 250 μm. The result shows that the light transmittance of the ceramic is extremely high, i.e., more than 90%, when subtracted the reflection less from the measured value. Ultraviolet absorption ends at 0.37 μm and the light transmittance of the ceramic is high over the whole visual range.

REFERENCE EXAMPLE 2

This particular Example set forth the ceramic having the same composition as that of the ceramic described in Example 5 but produced by the conventional method, for the comparison purpose.

Powders of PbO, ZrO$_2$, TiO$_2$ and strontium oxide (SrO, purity: 99.9%) were used as the starting materials. The powders of the starting materials were mixed together in the ratio calculated in accordance with the above composition, from which a green compact was prepared by the similar manner as in Example 5. In order to facilitate a complete sintering, the hot-pressing was effected at 1400° C, which was higher than the widely employed sintering temperature (1200° C), for 5 hours. The light transmittance of the obtained sample, when measured at the wavelength of 0.55 μm using a specimen of 250 μm thickness, was 13%, which value was considerably lower than that of the sample obtained by Example 5. The light transmittance of the latter mentioned sample is, as shown in FIG. 6, 52%. The reason for the low light transmittance of the sample produced in accordance with the conventional method is considered that a ceramic of chemically uniform composition may not be obtained by the conventional method since the solid phase reaction between the SrO powder and other powders included in the starting materials does not sufficiently take place, which causes the deterioration of the optical properties of the resultant ceramic. It is thus considered to be important that the Sr value should be incorporated into the ceramics from a starting material of a solid solution such as strontium titanate or strontium zirconate.

EXAMPLE 6

There are shown in Table 2 the light transmittances of the ceramics having the compositions generally represented by the chemical formula in the preceding Example 5 and defined by varying the value of the factor $x$. The light transmittances of the samples were measured at the wavelength of 0.55 μm using the samples of 250 μm thickness. As is apparent from Table 2, the light transmittance increases as the value of the factor $x$, i.e. the content of Sr, increase, due to the decrease in anisotropies of the crystal lattice.

Table 2

| x | Light Transmittance (%) |
| --- | --- |
| 0.20 | 43 |
| 0.26 | 50 |
| 0.30 | 53 |

EXAMPLE 7

A transparent ferroelectric ceramic was prepared similarly as in Example 5, which ceramic has a composition represented by the chemical formula of $(Pb_{0.7}, Sr_{0.3})(Zr_{0.7}, Ti_{0.3})O_3$, except that the starting materials were weighed out accurately in accordance with the composition set forth by the above chemical formula and excess PbO was not added to the mixture of the starting materials. The light transmittance of the resultant ceramic was measured at the wavelength of 0.55 μm using a sample of 200 μm thickness to give the light transmittance of about 29%. As is apparent from the test result hereinabove described, the ceramic produced in accordance with the method of this invention using strontium titanate as a starting material including Sr, even when it is produced without adding excess PbO, exhibits light transmittance considerably higher than that of the ceramic having the same composition but produced by the conventional technique. However, it is to be noted that the light transmittance of the ceramic obtained by Example 5, wherein an excess amount of PbO is added to the starting mixture, is higher than that of the ceramic obtained by this Example.

EXAMPLE 8

Solid solution ceramics of $(Pb_{1-x}, Sr_x)(Zr_y, Ti_{1-y})O_3$ system were produced similarly as in Example 5. The light transmittances of the obtained ceramics are shown in Table 3. In Table 3, there are shown the light transmittances of the ceramics having the composition obtained by varying the values of $x$ and $y$ in the above formula. The sample numbers set forth in Table 3 correspond, respectively, to each of the composition numbers written in FIG. 7 which is a phase diagram of $SrTiO_3$-$SrZrO_3$-$PbTiO_3$-$PbZrO_3$ system.

Table 3

| Sample No. | Light Transmittance (%) |
| --- | --- |
| 1 | 31 |
| 2 | 48 |
| 3 | 44 |
| 4 | 37 |
| 5 | 51 |
| 6 | 49 |
| 7 | 52 |
| 8 | 42 |

Table 3-continued

| Sample No. | Light Transmittance (%) |
| --- | --- |
| 9 | 48 |

The results set forth in Table 3 were obtained by the measurement conducted at the wavelength of 0.55 μm using samples of 250 μm thickness.

In FIG. 7, FEtat represents a ferroelectric phase having a crystal structure of tetragonal system, FErh represents a ferroelectric phase having a crystal structure of rhombohedral system, AFE α represents an antiferroelectric phase having a crystal structure of orthorhombic system, AFEβ represents an antiferroelectric phase having a crystal structure of tetragonal system, and PE represents a paraelectric phase having a crystal structure of cubic system. The values $x$ and $y$ in FIG. 7 are graduated in percentages, so that the abscissa corresponds to 100$y$ and the ordinate corresponds to 100(1-$x$).

In FIG. 7, the practically applicable compositions exhibiting high light transmittance are shown by the portion surrounded by the broken lines. Ranges outside of the portion are not preferable for the practical application of the present invention in that the portion of $SrTiO_3$-$SrZrO_3$ side is improper since the compositions within this range apt to segregate $ZrO_2$ during the sintering step and thus the production thereof is difficult, the portion of $SrTiO_3$-$PbTiO_3$ side is improper since the compositions within this range apt to vary during the sintering step which causes difficulties in their production, and the portion of $PbTiO_3$-$PbZrO_3$ is improper since the light transmittance of the ceramics having the compositions within this range are low.

EXAMPLE 9

This Example relates to a method of producing a transparent ferroelectric ceramics generally represented by the chemical formula of $(Pb_{1-x_1-x_2}, Ba_{x_1}, Sr_{x_2})(Zr_y, Ti_{1-y})O_3$.

Starting materials used were powders of barium titanate, barium zirconate, strontium titanate, lead oxide, zirconium oxide and titanium oxide. Sintered bodies of transparent ferroelectric ceramics having compositions generally represented by the above chemical formula were produced from the above starting materials in a similar manner as in Example 1. There are shown in the following Table 4 the light transmittance of the obtained ceramics which are measured at the wavelength of 0.55 μm using the samples of 0.25 mm thickness.

Table 4

| Composition | | | |
| --- | --- | --- | --- |
| $X_1$ | $X_2$ | y | Light Transmittance (%) |
| 0.15 | 0.15 | 0.90 | 55 |
| 0.05 | 0.25 | 0.70 | 53 |
| 0.25 | 0.05 | 0.90 | 56 |
| 0.05 | 0.15 | 0.80 | 49 |
| 0.15 | 0.05 | 0.65 | 43 |
| 0.10 | 0.10 | 0.84 | 50 |
| 0.10 | 0.10 | 0.83 | 50 |
| 0.10 | 0.10 | 0.80 | 52 |
| 0.10 | 0.10 | 0.75 | 54 |

As to the samples having the compositions defined by $x_1 = x_2 = 0.1$ in the above chemical formula, the relations between the polarization thereof and the electric field applied thereto at various temperatures were measured. By plotting the obtained data, P-E hysteresis curves were drawn. From these curves, the coexisting temperature region for the non-ferroelectric phase and the ferroelectric phase of the sample ceramics was obtained. The coexisting temperture region ws 60 deg. The wordings "coexisting temperature region" as hereinused mean the temperture region within which the ceramics are non-ferroelectric but readily to be induced therein ferroelectric phases when an electric field is applied thereto and the non-ferroelectric phases and the induced ferroelectric phases may stably coexist even when the ceramics are removed from the electric field. It is thus said that the coexisting temperature region of the sample ceramics is considerably broader than that of the conventional PLZT system ceramics, which have the coexisting temperature range of 10 deg., and that the temperature dependency of the ferroelectricities of the above samples is extremely little. From the above P-E hysiterisis curves, the temperature dependency in a coercive field of the same sample ceramics was also obtained. The temperature dependency of the sample is $-0.04$KV/cm.deg, which is less than that of the conventional PLZT ceramics, i.e. $-0.06$ KV/cm.deg. It is thus confirmed that the temperature dependency of the ferroelectricities of the above samples is also little in the coercive field.

EXAMPLE 10

This Example relates to a method of producing a transparent ferroelectric ceramic represented by the chemical formula of $(Pb_{0.7}, Sr_{0.3})(Zr_{0.7}, Ti_{0.3})O_3$ using as a starting material the coprecipitated material including oxalates of the components A and oxides of the components B.

Pure water was added to a mixture of 0.08 mol of lead acetate and 0.03 mol of strontium acetate to prepare 0.5 l of a mix solution, which is hereinbelow called as A solution. 0.5 l of ethanol was added to 0.5 l of aqueous oxalic acid solution containing 0.12 mol of oxalic acid to prepare B solution. The A solution was added to a solution prepared by adding 0.07 mol of zirconium oxide and 0.03 mol of titanium oxide to 0.5 l of ethanol, and the B solution was then added while agitating the mixture in a mixer. As a result, a coprecipitate was obtained, which contained Pb and Sr values as oxalates thereof coprecipitated with zirconium oxide and titanium oxide. The coprecipitate contained Pb value in an amount of 0.01 mol in excess calculated from the objective composition.

The coprecipitate was then separated from the solution in a centrifuge. The separated coprecipitate was cooled with liquid nitrogen to be freezed and thereafter dried in a drier to obtain a dried powder. The thusly obtained powder was calcined at 800° C for 4 hours to form a solid solution powder of complex oxides. After pulvarizing into fine powder in an agate pestle, the solid solution powder was intimately mixed with acetone in a ball mill, dried at 90° C for 24 hours, and heated in an oxygen flow at 700° C for one hour in order to completely remove acetone. After cooling the powder was moulded to obtain a green compact of cylindrical form under the pressure of 350 kg/cm².

The green compact was put in an alumina die and placed in an electric furnace to be hot-pressed in an oxygen flow at 1400° C for 5 hours under the compression pressure of 150 kg/cm².

The process of the hot-pressing was as follows. In order to completely subsituting the atmosphere in the electric furnace in which the green compact was placed, the furnace is firstly evacuated to about $10^{-2}$ Torr and oxygen gas was then introduced thereinto. In an atmosphere of oxygen flow, the temperature of the furnace was then raised at a rate of 5° – 10° C/min to 700° C and maintained for 2-5 hours. The furnace was again evacuated to about $10^{-2}$ Torr and oxygen gas was then flown into the furnace for substituting the atmosphere. The temperature of the furnace was raised at a rate of 5° – 10° C/min. to 1400° C while gradually applying pressure on the green compact to effect sintering.

The density of the thusly obtained sintered body was 99.7% as high as that of the theoretical density. The light transmittance of the sintered body was 60%, when measured at the wavelength of 0.55 μm using a specimen of 0.25 mm thickness.

EXAMPLE 11

This Example relates to a method of producing a transparent ferroelectric ceramic represented by the chemical formula of $(Pb_{0.65}, Ba_{0.35})ZrO_3$ using as a starting material the coprecipitated material including oxalates of the components A and oxides of the components B.

A transparent ferroelectric ceramic having the composition represented by the above chemical formula was produced in a similar manner in the preceding Example 10 except that 0.08 mol of lead acetate, 0.035 mol of barium acetate and 0.1 mol of zirconium oxide were used as the starting materials including A components and B components. The above-mentioned starting materials contained excess Pb value in an amount of 0.015 mol.

The obtained sintered body was uniform and had scarcely few voids and light transmittance of 60%. The light transmittance of the sample was measured under the same conditions as in Example 10.

There are numbers of ceramics other than those described in any of the preceding Examples on which the method of the present invention may be effectively applied to give transparent ferroelectric ceramics. Examples of such the ceramics are shown in the following Table 5 with reference to the conditions for making them and the light transmittances of the obtained ceramics. The light transmittances are measured by using samples of 250 μm thickness at each of the wavelengths (λ) shown in the Table.

Table 5

| Composition | Condition of Hot-pressing | | | Light Transmittance (%) | |
| --- | --- | --- | --- | --- | --- |
| | Temperature (°C) | Time (hrs) | Pressure (kg/cm²) | λ = 0.55 μm | λ = 0.1 μm |
| $Pb(Mg_{1/2}, W_{1/2})O_3$ | 1350 | 20 | 150 | 45 | 55 |
| $Pb(Sc_{1/2}, Nb_{1/2})O_3$ | 1350 | 20 | 150 | 52 | 60 |
| $Pb(In_{1/2}, Nb_{1/2})O_3$ | 1350 | 20 | 150 | 50 | 55 |
| $Pb(Sc_{1/2}, Ta_{1/2})O_3$ | 1350 | 20 | 150 | 55 | 60 |
| $Pb(Zn_{1/2}, Nb_{2/3})O_3$ | 1400 | 5 | 150 | 50 | 58 |

Table 5-continued

| Composition | Condition of Hot-pressing | | | Light Transmittance (%) | |
|---|---|---|---|---|---|
| | Temperature (°C) | Time (hrs) | Pressure (kg/cm²) | $\lambda = 0.55$ μm | $\lambda = 0.1$ μm |
| $Pb(Cd_{1/3}, Nb_{2/3})O_3$ | 1400 | 5 | 150 | 35 | 50 |
| $Pb(Mg_{1/3}, Ta_{2/3})O_3$ | 1400 | 5 | 200 | 48 | 55 |
| $Pb(Ni_{1/3}, Ta_{2/3})O_3$ | 1400 | 5 | 200 | 45 | 30 |
| $Pb(Mg_{1/3}, Nb_{2/3})O_3$ | 1400 | 5 | 200 | 55 | 62 |
| $0.5KNbO_3$–$0.5KtaO_3$ | 1150 | 100 | 500 | 56 | 60 |
| $0.45CaTiO_3$–$0.55PbTiO_3$ | 1150 | 5 | 150 | 58 | 62 |
| $0.35SrTiO_3$–$0.65BaTiO_3$ | 1450 | 20 | 70 | 56 | 60 |
| $0.35CaZrO_3$–$0.65BaZrO_3$ | 1450 | 20 | 70 | 45 | 51 |
| $(Pb_{0.7},Ba_{0.3})(Hf_{0.7},Ti_{0.3})O_3$ | 1400 | 5 | 150 | 52 | 64 |
| $(Pb_{0.7},Sr_{0.3})(Hf_{0.7},Ti_{0.3})O_3$ | 1400 | 5 | 150 | 48 | 65 |
| $0.85BaTiO_3$–$0.15BaSnO_3$ | 1400 | 5 | 150 | 53 | 60 |
| $0.4NaNbO_3$–$0.6KtaO_3$ | 1200 | 100 | 500 | 57 | 64 |
| $0.7PbTiO_3$–$0.3CaSnO_3$ | 1400 | 5 | 150 | 51 | 60 |
| $0.7PbTiO_3$–$0.3SrSnO_3$ | 1400 | 5 | 150 | 55 | 60 |
| $0.6PbTiO_3$–$0.4BaSnO_3$ | 1400 | 5 | 150 | 59 | 65 |
| $0.6PbTiO_3$–$0.4(Li_{1/2},Ce_{1/2})TiO_3$ | 1250 | 20 | 200 | 45 | 55 |
| $0.5PbTiO_3$–$0.5(Li_{1/2},Nd_{1/2})TiO_3$ | 1250 | 20 | 200 | 50 | 58 |
| $0.4PbTiO_3$–$0.6Pb(Mg_{1/2},W_{1/2})O_3$ | 1350 | 20 | 200 | 58 | 65 |
| $0.6PbZrO_3$–$0.4(K_{1/2},Bi_{1/2})ZrO_3$ | 1200 | 3 | 400 | 44 | 50 |
| $(Ca_{0.2},Sr_{0.2},Ba_{0.6})TiO_3$ | 1450 | 20 | 70 | 58 | 64 |
| $(Ca_{0.5},Ba_{0.1},Pb_{0.4})TiO_3$ | 1400 | 10 | 150 | 58 | 63 |
| $(Pb_{0.7},Ba_{0.3})(Sn_{0.6},Ti_{0.4})O_3$ | 1400 | 5 | 150 | 55 | 60 |

As described hereinabove, there may be produced, according to the present invention, transparent ceramics generally represented by the formula of $ABO_3$ having perovskite-type crystal structures, where ceramics exhibit considerably high transparencies to the lights when compared to the ceramics produced by the conventional method, by selecting such the compositions that are composed of crystal grains having small optical anisotropies and absorbing minimum amounts of light and by hot-pressing to sinter the same so as to eliminate the light scattering centers included therein.

The sintered bodies of the ceramics obtained by the embodiments of the present invention have superior electrical and optical properties and conveniently applied for various devices such as optical memory elements, light modulator elements, shutters, image storage and display devices and other optical devices.

What is claimed is:

1. A method of producing an optically transparent ceramic having a perovskite-type crystal structure and represented by the general formula $ABO_3$, wherein the component A consists of Pb and at least one other element selected from the group consisting of Ba and Sr and the component B is selected from the group consisting of Zr or a mixture of Zr and Ti, said method comprising forming a powdery mixture of lead oxide, a solid solution which consists of either barium oxide or strontium oxide or both with an oxide of at least one of the elements of component B, calcining the resultant powdery mixture to form a complex oxide powder, molding said complex oxide powder under pressure to yield a green compact, and hot-pressing said green compact under a pressure greater than 70 kg/cm² at a temperature of 1200°–1500° C. for more than 2 hours in an oxygen atmosphere.

2. A method as claimed in claim 1, wherein the starting material contains PbO in an amount of 3 – 20 mol % in excess of that calculated for producing said optically transparent ceramic.

3. A method as claimed in claim 1, wherein the hot-pressing is effected under a pressure of 70 – 400 kg/cm² at a temperature of 1300 – 1450° C for 5 – 200 hours.

4. A method as claimed in claim 1, wherein the ceramic has the composition defined by the portion surrounded by the broken lines, the abscissa and the ordinate of FIG. 5, said portion including said lines.

5. A method as claimed in claim 2, wherein the ceramic has the composition defined by the portion surrounded by the broken lines, the abscissa and the ordinate of FIG. 5, said portion including said lines.

6. A method as claimed in claim 1, wherein the ceramic has the composition defined by the portion surrounded by the broken lines and the ordinate of FIG. 7, said portion including said lines.

7. A method as claimed in claim 2, wherein the ceramic has the composition defined by the portion surrounded by the broken lines and the ordinate of FIG. 7, said portion including said lines.

8. A method as claimed in claim 1, wherein the ceramic has the composition represented by the general formula of $(Pb_{1-x_1-x_2}, Ba_{x_1}, Sr_{x_2})(Zr_y, Ti_{1-y})O_3$, wherein $0.05 \leq x_1 + x_2 \leq 0.5$ and $0.6 \leq y \leq 0.91$.

9. A method as claimed in claim 2, wherein the ceramic has the composition represented by the general formula of $(Pb_{1-x_1-x_2}, Ba_{x_1}, Sr_{x_2})(Zr_y, Ti_{1-y})O_3$, wherein $0.05 \leq x_1 + x_2 \leq 0.5$ and $0.6 \leq y \leq 0.91$.

10. A method as claimed in claim 8, wherein $0.05 \leq x_1 + x_2 \leq 0.3$.

11. A method as claimed in claim 9, wherein $0.05 \leq x_1 + x_2 \leq 0.3$.

12. A method for producing an optically transparent ceramic having a perovskite-type crystal structure and represented by the general formula of $ABO_3$, wherein A consists of Pb and at least one other element selected from the group consisting of Ba and Sr, and B, is selected from the group consisting of Zr or a mixture of Zr and Ti, said method comprising forming a powdery mixture containing elements A, B and O in the form of oxides and titanates and/or zirconates, the ratio of elements A, B and O in said mixture corresponding to the ratio of elements A, B and O in said $ABO_3$, said at least one other element being present in said powdery mixture in the form of a zirconate, a titanate or both a zirconate and a titanate, forming a green compact from said powdery mixture by calcining said powdery mixture to produce a complex oxide and moulding the powdery mixture so calcined under pressure, and hot pressing said green compact in an oxygen atmosphere under a pressure of higher than 70 kg/cm² at a temperature of 1,200° to 1,500° C for more than two hours.

13. The process of claim 12, wherein said powdery mixture is so compounded that said transparent ceramic has a formula $(Pb_{1-x_1-x_2}, Ba_{x_1}, Sr_{x_2})(Zr_y, Ti_{1-y})O_3$ wherein $0.05 \leq x_1 + x_2 \leq 0.5$ and $0.6 \leq y \leq 0.91$.

14. The method of claim 13, wherein said powdery mixture is so compounded that $0.05 \leq x_1 + x_2 \leq 0.3$ and $0.6 \leq y \leq 0.91$.

15. A method for producing an optically transparent ceramic having a perovskite-type crystal structure and represented by the general formula of $ABO_3$, wherein A consists of Pb and at least one other element selected from the group consisting of Ba and Sr, and B, is selected from the group consisting of Zr or a mixture of Zr and Ti, said method comprising forming a powdery mixture containing elements A, B and O in the form of oxides and titanates and/or zirconates, the ratio of elements A, B and O in said mixture corresponding to the ratio of elements A, B and O in said $ABO_3$ except that said powdery mixture contains a 3 to 20 mole % excess of PbO, said at least one other element being present in said powdery mixture in the form of a zirconate, a titanate or both a zirconate and a titanate, forming a green compact from said powdery mixture by calcining said powdery mixture to produce a complex oxide and moulding the powdery mixture so calcined under pressure, and hot pressing said green compact by in an oxygen atmosphere under a pressure of higher than 70 kg/cm² at a temperature of 1,200° to 1,500° C for more than two hours.

16. The method of claim 15, wherein said powdery mixture is so compounded that said transparent ceramic has a formula $(Pb_{1-x_1-x_2}, Ba_{x_1}, Sr_{x_2})(Zr_y, Ti_{1-y})O_3$ wherein $0.05 \leq x_1 + x_2 \leq 0.5$ and $0.6 \leq y \leq 0.91$.

17. The method of claim 16, wherein said powdery mixture is so compounded that $0.05 \leq x_1 + x_2 \leq 0.3$ and $0.6 \leq y \leq 0.91$.

18. The product of the process of claim 12.

19. The product of the process of claim 15.

20. The process of claim 1, wherein said solid solution is selected from the group consisting of $BaTiO_3$, $BaZrO_3$, $Ba(Ti,Zr)O_3$, $SrTiO_3$, $SrZrO_3$, $Sr(Ti,Zr)O_3$, $(Ba,Sr)TiO_3$, $(Ba,Sr)ZrO_3$, and $(Ba,Sr)(Ti,Zr)O_3$.

21. A process for producing an optically transparent ceramic having a perovskite-type crystal structure and represented by the general formula $ABO_3$, wherein component A includes Pb and at least one element selected from the group consisting of Ba and Sr and component B includes Zr or both Zr and Ti, said method comprising:

forming an aqueous solution of compounds containing the elements of component A, uniformly dispersing in said solution oxides of the elements constituting the component B to form a dispersion, the amount of said oxides added to said solution being such that the ratio of the component A elements to the component B elements in said dispersion corresponds to the ratio of component A elements to component B elements in said $ABO_3$, forming a uniform precipitate of the oxide or oxides of component B and the oxalate of component A by adding to said dispersion oxalic acid in an amount of about 1.05 to 1.1 times the amount of component A in said dispersion on an equivalent basis and an alcohol selected from the group consisting of methanol, ethanol and propanol, drying said precipitate, calcining the dried precipitate to form a complex oxide therefrom, moulding said complex oxide under pressure to form a green compact, and hot-pressing said green compact under a pressure of greater than 70 kg/cm² in an atmosphere of oxygen at a temperature from 1,200° to 1,500° C for more than two hours.

* * * * *